Patented Oct. 9, 1945

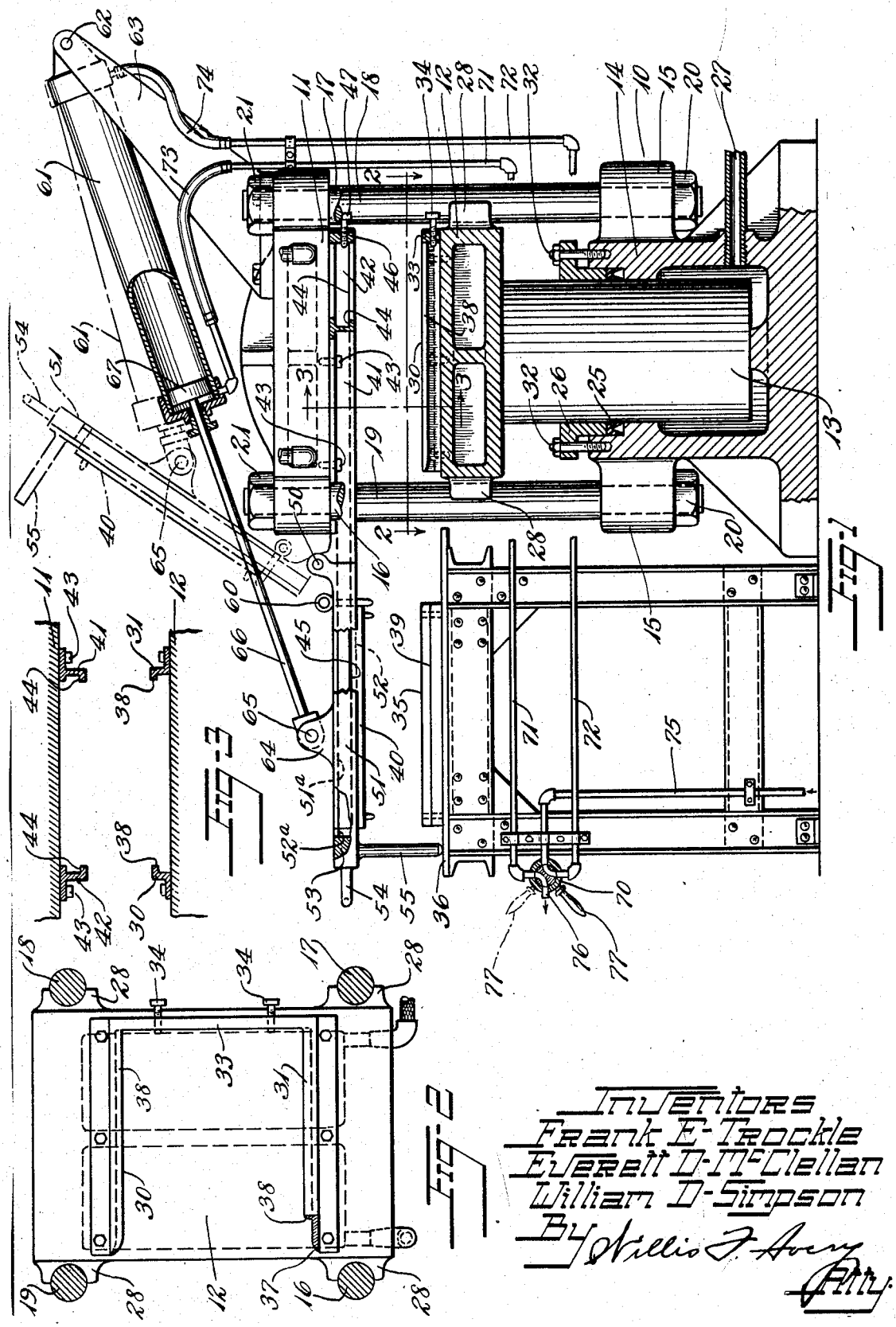

2,386,641

UNITED STATES PATENT OFFICE 2,386,641

MOLDING APPARATUS

Frank E. Trockle, Everett D. McClellan, and William D. Simpson, Akron, Ohio, assignors to The B. F. Goodrich Company, New York, N. Y., a corporation of New York Application January 11, 1944, Serial No. 517,790

6 Claims. (Cl. 18—16)

This invention relates to molding apparatus and more especially to apparatus for handling molds for molding plastic materials.

In prior expedients where hydraulic presses have been used for performing the molding operation, considerable difficulty has been experienced in molding rubber or other rubber-like materials accurately to dimensions as a result of non-uniformity in the placing of molds in the press, and great strength has been required of the operators to manipulate the heavy molds required.

The present invention aims to overcome the foregoing and other difficulties.

The principal objects of the invention are to provide accuracy of molding together with facility of handling, to provide uniform positioning of the molds in successive molding operations, to provide convenient positioning of the mold plates for inspection and cleaning, to provide power handling of the upper mold plate, and to provide safety and convenience of procedure and simplicity of apparatus.

These and other objects will appear from following description and the accompanying drawing.

Of the drawing:

Fig. 1 is a side elevation, partly broken away and partly in section, of apparatus constructed in accordance with and embodying the invention, with the upper guide rails shown in lowered position.

Fig. 2 is a horizontal sectional detail view, taken on line 4—4 of Fig. 1, parts being broken away.

Fig. 3 is a vertical cross-sectional detail view, taken on line 3—3 of Fig. 1.

Referring to the drawing, the numeral 10 designates a hydraulic press having an upper fixed platen 11 and a vertically movable lower platen 12. The lower platen is supported on a ram 13 vertically movable within a cylinder 14 which forms the base of the press. The cylinder has ears 15; and strain rods 16, 17, 18, 19 are fixed to the ears and secured by nuts 20 threaded thereon. The upper end of the strain rods extend through the upper platen which is secured thereto by nuts 21. The rods are reduced in diameter where they extend through the ears 15 and through the upper platen and shouldered to hold the parts in properly spaced apart relation.

The upper and lower platens are hollow to provide steam chambers for heating them, or steam or otherwise heated platens are mounted thereon for providing heat to the mold members, and suitable steam connections to the heating platens are provided for circulating a heating medium thereto.

The cylinder 14 is provided with a U-shaped gland packing 25 for sealing the pressure fluid about the ram 13 and a gland ring 26, secured by studs 32, holds the packing in place. Fluid for raising the ram under pressure is connected to the cylinder by a pipe 27 which handles flow in either direction through a suitable control valve (not shown).

The lower platen is guided in its vertical movement by bearing shoes 28 formed thereon for engaging the rods 16, 17, 18, 19 in sliding engagement. The lower platen rests on the ram 13 but is not fixed thereto.

While the platens 11, 12 are constructed with parallel pressing faces, some deflection of the platens, due to the great hydraulic pressure employed, is inevitable, and placing of the mold out of center of the platens may cause some angular or non-parallel presentation of the lower platen with respect to the upper one resulting in inaccuracies of dimensions of the molded product.

To provide for accurate placing of the mold plates in the press so as to duplicate molding conditions in the forming of successive articles, the lower platen 12 is provided with parallel guide rails 30, 31 for engaging the sides of the lower mold plate 35, and a stop rail 33 for engaging and positioning an end thereof. The stop rail may have adjusting screws 34 threaded therethrough for adjustably positioning the mold. The lower mold plate 35 is shown as resting on a table 36 mounted in front of the press and adapted to support the mold plate 35 at the same elevation as that of the lower platen 12 at its lowered position. The rails 30, 31 are rounded as at 37 at their front ends to facilitate entry of the mold therebetween and may have overhanging ledges 38 for engaging over a rabbetted margin 39 of the mold plate to act as stripping means when the press is opened, if desired, although such ledges may usually be omitted.

For guiding and positioning the upper mold plate 40, parallel guide rails 41, 42 are fixed to the upper platen, as by screws 43. These rails have mold supporting ledges 44 at the lower sides of their inwardly facing margins for engaging rabbetted side margins 45 of the upper mold plate. A stop rail 46 is mounted on the platen for positioning the rear margin of the mold plate, and may be provided with adjustable stop screws 47 for adjustably locating the upper mold plate.

The rails on the upper and lower platens accurately guide the mold plates to the same molding position each time they are inserted in the press so that the molds are properly centered and closed in parallelism and all deflections of the platens and molds are the same at each successive operation so that uniformity of product dimensions is attained.

To provide for inspection and cleaning of the upper mold plate and handling of the plates with a minimum amount of physical exertion on the part of the operator, the upper rails 41, 42 are made to extend beyond the front of the press and across the table 36, and the rails are made in sections, hinged as at 50 to each other at a position slightly forward of the platen 11. The hinged extensions 51, 52 of the respective rails 41, 42 are joined by a cross bar 53 at their forward ends and a handle 54 is provided on the cross bar for handling the extensions in unison. For supporting the extensions and a mold plate 40 supported thereby, over the table 36, a leg 55 is provided on each rail extension and adapted, when resting on the table, to hold the rails in horizontal position as seen in Fig. 1. The rail extensions with the mold plate 40 may be swung to an inclined position as indicated in dot and dash lines by means of the handle 54 or otherwise where the face of the mold plate is exposed to the operator for inspection or cleaning. To prevent dropping of the mold plate, in the elevated position, a locking pin 60 is provided adapted to pass through an aperture in rail extension 51 in position to block the mold plate against travel along the rail, and upper ledges 51a, 52a are provided on at least the extensions 51, 52 to extend over the mold plate. Such ledges may also extend throughout the rails 41, 42, if desired.

For facilitating handling of the upper mold plate and the rail extensions, with a minimum of effort on the part of the operator, a double-acting fluid operated cylinder 61 is pivotally mounted, as at 62, between a pair of brackets 63 fixed to the upper platen of the press. Ears 64 are provided on the rail extensions 51, 52 and a cross-bar 65 extends between the ears and is secured thereto. The piston rod 66 of the cylinder 61 is pivotally connected to the cross-bar 65 and connects it to the piston 67 which operates in the cylinder 61. The arrangement is such that when fluid under pressure is supplied to the rod end of the cylinder, the piston is moved to the position shown in dot and dash lines in Fig. 1 and the rail extensions and mold are elevated to the position shown in that figure, and when fluid is admitted under pressure to the head of the cylinder and the rod end exhausted, the rail extensions and the mold plate are returned to the horizontal position as shown in full lines in Fig. 1.

For operating the cylinder 61, a four-way control valve 70 is mounted at the table 36. Pipes 71, 72 extend from ports of the valve and are connected by flexible hose 73, 74 respectively to the rod end and the head end of the cylinder 61. Fluid under pressure is delivered to a third port of the valve 70 from a source (not shown) by a pipe 75. An exhaust pipe 76 is connected to a fourth port of the valve. The arrangement is such that with the valve handle 77 turned down as shown in full lines in Fig. 1 pipe 71 is opened to exhaust and pipe 72 connected to pipe 75 through the valve and pressure is applied to the head end of cylinder 61, while with the valve handle 77 turned to the raised position, as indicated in dot and dash lines in Fig. 1, pipe 72 is opened to exhaust and pipe 71 connected to pipe 75 through the valve, and pressure is applied to the rod end of cylinder 61 to raise the rail extensions.

The operation of the apparatus is as follows:

With the rail extensions 51, 52 horizontal and the platen 12 lowered as in Fig. 1, the upper mold plate is located in the slide extension as shown and the bottom mold plate is on the table 36. In this position blanks of the plastic material are placed on the mold cavities of the lower mold plate and the plate is shoved over the table onto the platen 12 between the guide rails 30, 31 and against the stop rail. The upper mold plate is pushed back along rails 40, 41 until it strikes the stop 46. The ram 13 is now actuated by applying hydraulic pressure to close the mold. The guide rails are of less depth than the depth of the mold and during vulcanization permit the mold plates to contact the platens. After vulcanization, the cylinder 14 is drained to lower platen 12 and separate the mold plates. The lower mold plate 35 is drawn out of the press onto the table and the upper mold plate 40 is drawn from the press onto the rail extensions 51, 52. The pin 60 is entered in the opening in rail 51 to block the mold. Then the valve handle 77 is moved to raised position, as in Fig. 1 and the cylinder 61 raises the mold plate to the position shown in Fig. 1 without substantial effort on the part of the operator. The operator may then inspect, clean and reload the mold plates. The valve handle 77 is then turned down, as in Fig. 1, and the rail extensions with the mold plate are lowered to horizontal position. The pin 60 is then removed and the mold plates shoved into the press.

The apparatus provides for accurate return of the mold plates to the same position in the press at each operation. The mold plates are within full sight of the operator for inspection, loading, and cleaning. The operator is relieved from heavy lifting of the mold plates.

Variations may be made without departing from the scope of the invention as it is defined by the following claims.

We claim:

1. Mold handling mechanism comprising a molding press having platens movable toward and from each other, hinged mold guiding rails having a section secured along a press platen and a section hingedly connected thereto, and means for locking a mold plate within the hinged section of the rails.

2. Molding handling mechanism comprising a molding press having platens movable toward and from each other, hinged mold guiding rails having a section secured along a press platen, a section hingedly connected thereto, means for locking a mold plate within the hinged section of the rails, and means for bodily moving the hinged section and the mold to a position angular to the secured section.

3. Molding apparatus comprising a molding press having upper and lower platens, the lower of which is movable toward and from the upper, a table having a top level with the lowermost position of the lower platen and adjacent thereto, parallel guide rails on the lower platen for positioning a mold plate within the press and guiding it to the table, parallel guide rails on the upper platen for positioning a second mold plate within the press, extension rails hinged to the rails on the upper platen for positioning a mold plate within the press and guiding it to a position over the table, legs for supporting said extension rails from said table in horizontal position, means for locking the upper mold plate within said extension rails against sliding movement, and means for moving said extension rails angularly about their hinge connection with the mold plate locked therein to increase the accessibility of the face of the mold plate.

4. Molding apparatus comprising a mold, a pair of press platens, means for moving one of the platens toward the other, guide rails on one of the platens arranged to support said mold, extension guide rails hinged to the first said guide rails in a manner for said mold to be moved on said rails across the hinged connection into and out of the space between said platens, and means for moving the extension guide rails about their hinged connection with said mold upon said extension guide rails to an elevated position to increase the accessibility of the face of said mold 5. Molding apparatus comprising a mold having a plurality of separable mold plates, a pair of superimposed press platens, means for moving one of the platens toward and from the other, guide rails on said platens for aligning mold plates therebetween, the rails on the upper platen being arranged to support a mold plate, extension guide rails hinged to the rails of the upper platen in a manner for the mold plate thereon to be moved on said rails across the hinged connection into and out of the space between said platens, and means for moving the extension guide rails about their hinged connection with the mold plate upon said extension guide rails from a generally horizontal position to a position past the vertical to increase the accessibility of the face of said mold plate.

6. Molding apparatus comprising a mold having a plurality of separable mold plates, a molding press having upper and lower platens, the lower of which is movable toward and from the upper, a table having a top level with the lowermost position of the lower platen and adjacent thereto, parallel guide rails on the lower platen for positioning a mold plate within the press and guiding it to the table, parallel guide rails on the upper platen for positioning a second mold plate within the press, extension rails hinged to the rails on the upper platen for positioning a mold plate within the press and guiding it across the hinged connection to a position over the table, means supporting said extension rails in a horizontal position above said table, means for locking the upper mold plate within said extension rails against sliding movement, and means for moving said extension rails angularly about their hinge connections with the mold plate locked therein to increase the accessibility of the face of the mold plate.

FRANK E. TROCKLE.
EVERETT D. McCLELLAN.
WILLIAM D. SIMPSON.